United States Patent
Daoud et al.

(10) Patent No.: US 7,349,533 B2
(45) Date of Patent: Mar. 25, 2008

(54) TELEPHONY TRANSITIONING SYSTEM

(75) Inventors: Naile S. Daoud, Kanata (CA); Calvin E. Drover, Ottawa (CA); James E. Reaves, Raleigh, NC (US); Alvin P. Enns, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 720 days.

(21) Appl. No.: 10/262,616

(22) Filed: Oct. 1, 2002

(65) Prior Publication Data

US 2004/0062377 A1    Apr. 1, 2004

(51) Int. Cl.
*H04M 3/42* (2006.01)
(52) U.S. Cl. .............................. 379/220.01; 379/221.01
(58) Field of Classification Search ........... 379/220.01, 379/207.11, 221.04, 221.1
See application file for complete search history.

(56) References Cited

U.S. PATENT DOCUMENTS

| | | | |
|---|---|---|---|
| 4,754,479 A * | 6/1988 | Bicknell et al. | 379/221.13 |
| 4,943,999 A * | 7/1990 | Ardon | 379/221.01 |
| 5,048,081 A * | 9/1991 | Gavaras et al. | 379/230 |
| 5,586,177 A * | 12/1996 | Farris et al. | 379/230 |
| 5,661,789 A * | 8/1997 | Boyle et al. | 379/207.02 |
| 5,848,144 A * | 12/1998 | Ahrens | 379/219 |
| 5,881,132 A * | 3/1999 | O'Brien et al. | 379/35 |
| 6,577,626 B2 * | 6/2003 | Christie et al. | 370/384 |
| 6,724,765 B1 * | 4/2004 | Howell | 370/410 |
| 6,792,100 B2 * | 9/2004 | Nekrasovskaia et al. | 379/230 |

FOREIGN PATENT DOCUMENTS

EP    0435448 A2    7/1991

OTHER PUBLICATIONS

PCT International Search Report for PCT/IB03/04266, mailed Jan. 21, 2004.

* cited by examiner

*Primary Examiner*—Ahmad F. Matar
*Assistant Examiner*—Aamir Haq
(74) *Attorney, Agent, or Firm*—Withrow & Terranova, P.L.L.C.

(57) ABSTRACT

The present invention provides a Universal Signaling Point (USP) that acts as a liaison between a call signaling network and a number of switching entities, which support lines, trunks, or a combination thereof. During a transition of the lines or trunks from a donor entity to a host entity, call signaling between the host and donor entities and the SS7 network is routed through the USP. When transitioning the lines or trunks from the donor entity to the host entity, call signaling messages intended for the donor entity are routed to either the donor or host entity, whichever actually supports the lines or trunks. The USP is provided information indicative of whether a line or trunk has been transitioned to the host entity. The USP can compare information provided in the call signaling message with the transition information and route the message to the appropriate donor or host entity.

29 Claims, 10 Drawing Sheets

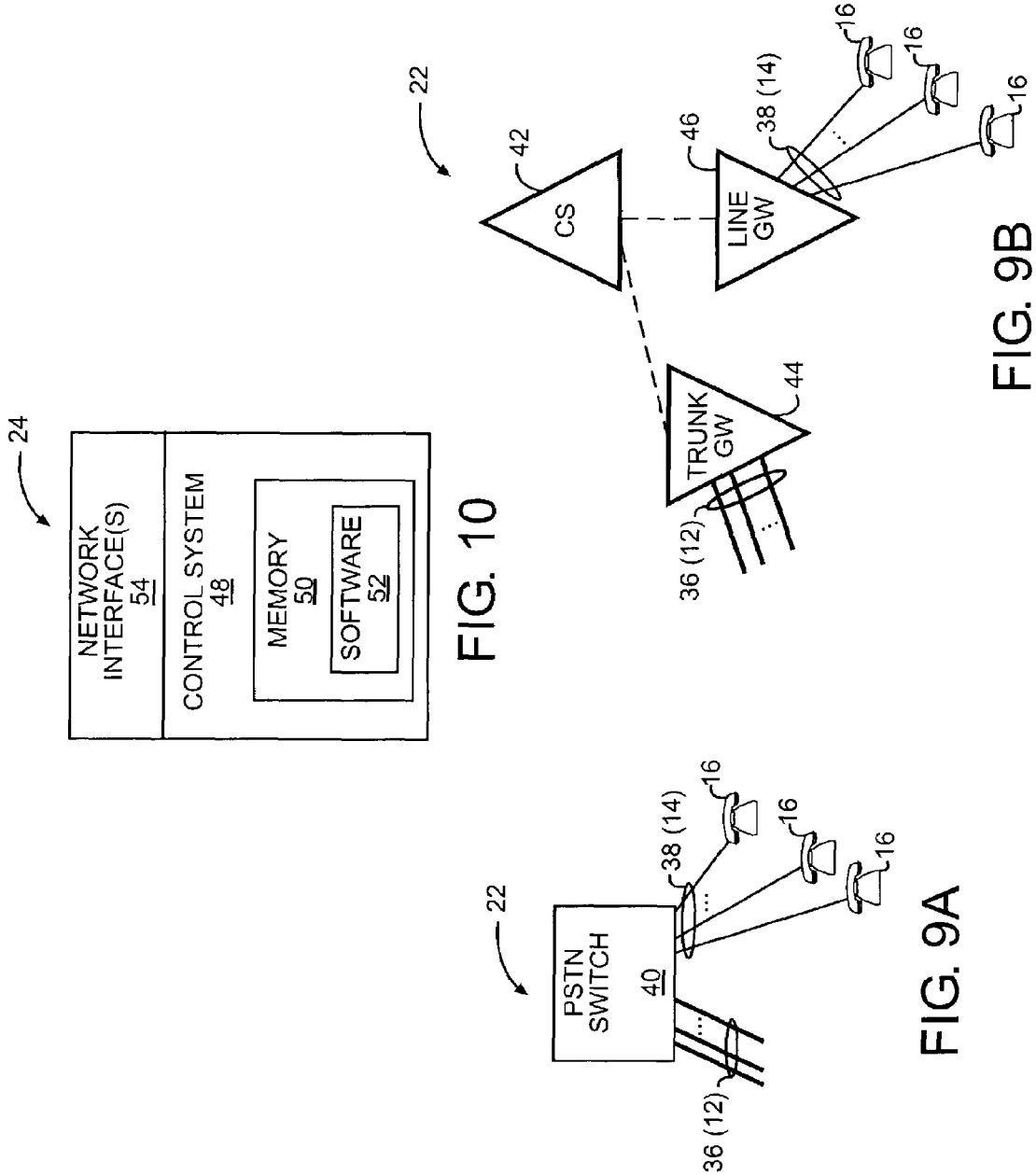

TELEPHONY TRANSITIONING SYSTEM

FIELD OF THE INVENTION

The present invention relates to telephony, and in particular to moving lines, trunks, or a combination thereof from one switching system to another with minimal impact on the overall communication network and to end users of the communication network.

BACKGROUND OF THE INVENTION

Telephone operators are under continuous pressure to reduce operating costs, as well as to upgrade legacy systems to provide more services and support additional customers. One result of these pressures is the consolidation of signaling and switching offices into a smaller number of relatively large offices capable of providing more services to more customers. In general, a transition from one switching office to another requires physically moving lines and trunks from one switching office to another, which necessarily interrupts services to end customers and requires configuration changes in other offices throughout the signaling network. Given the large number of lines and trunks associated with even smaller switching offices and the desire to minimize interruptions in service, there is a need for a way to efficiently transition telephony services from one switching office to another to support consolidation, expansion, or general re-homing of telephony lines, trunks, and services.

SUMMARY OF THE INVENTION

The present invention provides a Universal Signaling Point (USP), including route master routing logic, that acts as a liaison between a call signaling network and a number of switching entities, which support lines, trunks, or a combination thereof. During a transition of lines, trunks, or a combination thereof from a donor entity to a host entity, call signaling between the host and donor entities and the SS7 network is routed through the USP. When transitioning the lines or the trunks from the donor entity to the host entity, call signaling messages intended for the donor entity are routed to either the donor entity or the host entity, whichever actually supports the selected lines or trunks. The USP is provided information indicative of whether a line or trunk has been transitioned to the host entity. Thus, the USP can compare information provided in the call signaling message with the transition information and route the message to the appropriate donor or host entity.

During transitioning of the lines or trunks, interworking trunks maybe established between the donor and host entities to support local traffic, wherein one line associated with the call is supported by the host entity and the other line is supported by the donor entity. Further, call signaling associated with lines, is preferably routed based on directory numbers associated with the lines and call signaling associated with the trunks is preferably routed based on circuit identification codes. The present invention is particularly beneficial in SS7 type networks, but is applicable to various call signaling environments including IP type networks. Preferably, the USP is configured to have multiple addresses, or point codes, which are associated with the host and donor entities. Further, the host entity is preferably configured to react and respond to messages associated with the point code for itself and the address or point code for the donor entity. Thus, when the SS7 signaling network forwards call signaling messages for transitioned lines or trunks to the USP route master logic, the host entity can essentially assume the identity of the donor entity by presenting a single SS7 point code or signaling address to the signaling network. The donor entity, along with other elements in the SS7 network, is unaware of the USP's routing of call signaling based on the location of the lines or trunks at either the donor or host entities.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 9A is a block representation of a host switching system in the form of a traditional public switched telephone network switch according to one embodiment of the present invention.

FIG. 9B is a block representation of a switching system configured as a call server associated with one or more gateways supporting lines and trunks according to one embodiment of the present invention.

FIG. 10 is a block representation of a universal switching point according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
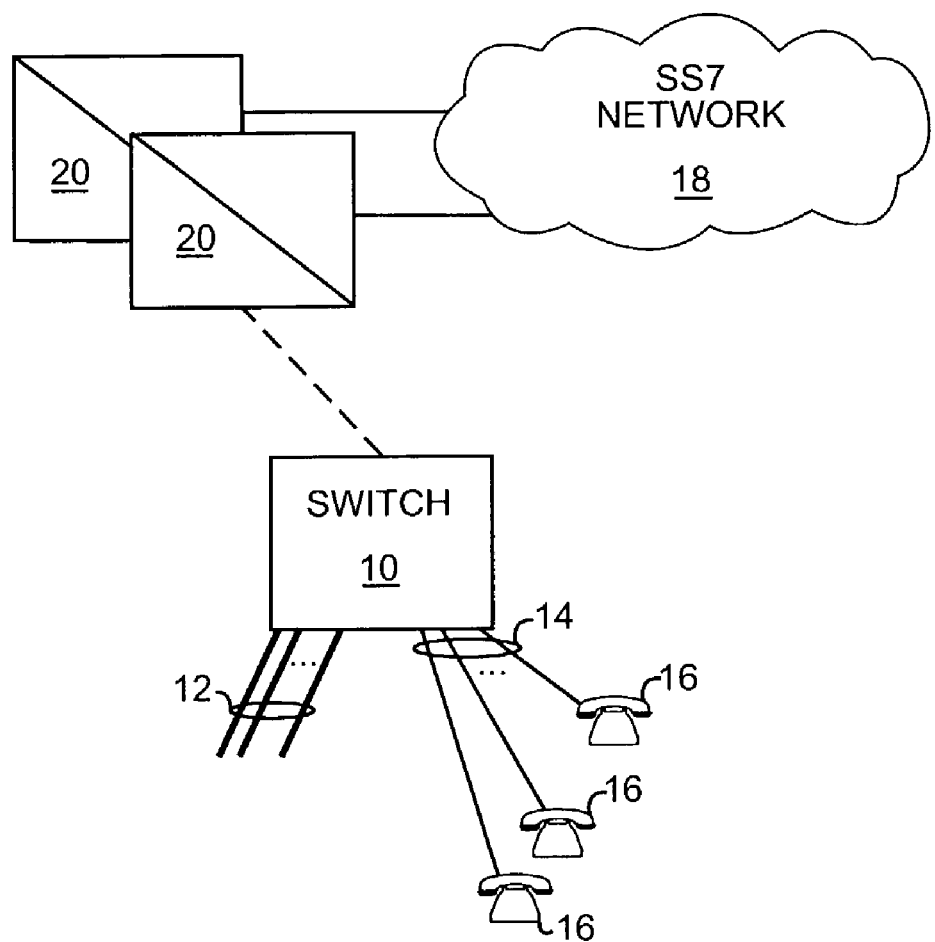
FIG. 1 is a block representation of a communication environment according to the prior art.

With reference to FIG. 1, a typical switch 10 in the public switched telephone network (PSTN) is illustrated as supporting multiple trunks 12 and multiple lines 14, which directly terminate at customer premises and support customer premise equipment, such as telephones 16. As is well-known in the art, the switch 10 will support either local or inter-office calls, wherein local calls originate and terminate on lines 14 and are directly supported by the switch 10, and inter-office calls either originate or terminate at a remote switch and are carried between the switch 10 and the remote switch via the trunks 12.

Call signaling for establishing calls and providing various intelligent network (IN) functions and services are normally supported by a call signaling network, such as a signaling systems 7 (SS7) network 18. Typically, the switch 10 is considered part of the SS7 network 18, and acts as a signal switching point (SSP). SSPs are typically supported by pairs of signal transfer points (STPs) 20, which facilitate the transfer of call signaling to signaling control points (not shown) in the SS7 network 18. As such, call signaling for inter-office calls and certain intelligent network services for local calls requires call signaling messages to be transferred between elements in the SS7 network 18 and the switch 10 via the STPs 20. Addressing for the call signaling messages is typically based on point codes, which are associated with various elements in the SS7 network 18. As such, the switch 10, the STPs 20, and other elements in the SS7 network 18 will have unique point codes. When trunks 12 or lines 14 need to be moved to another switching system, assuring that call signaling reaches the appropriate switching system is required in addition to physically moving and provisioning the trunks 12 and lines 14.

The present invention facilitates the efficient transitioning of lines 14 and trunks 12 from one switching system to another. For the purposes of description, a general transitioning process is described in association with the flow diagram of FIGS. 2A-2B. Further, FIGS. 3-8 are provided to illustrate the various states in the transitioning process, and are discussed throughout the explanation of the flow chart provided in FIGS. 2A-2B.

Figure 3:
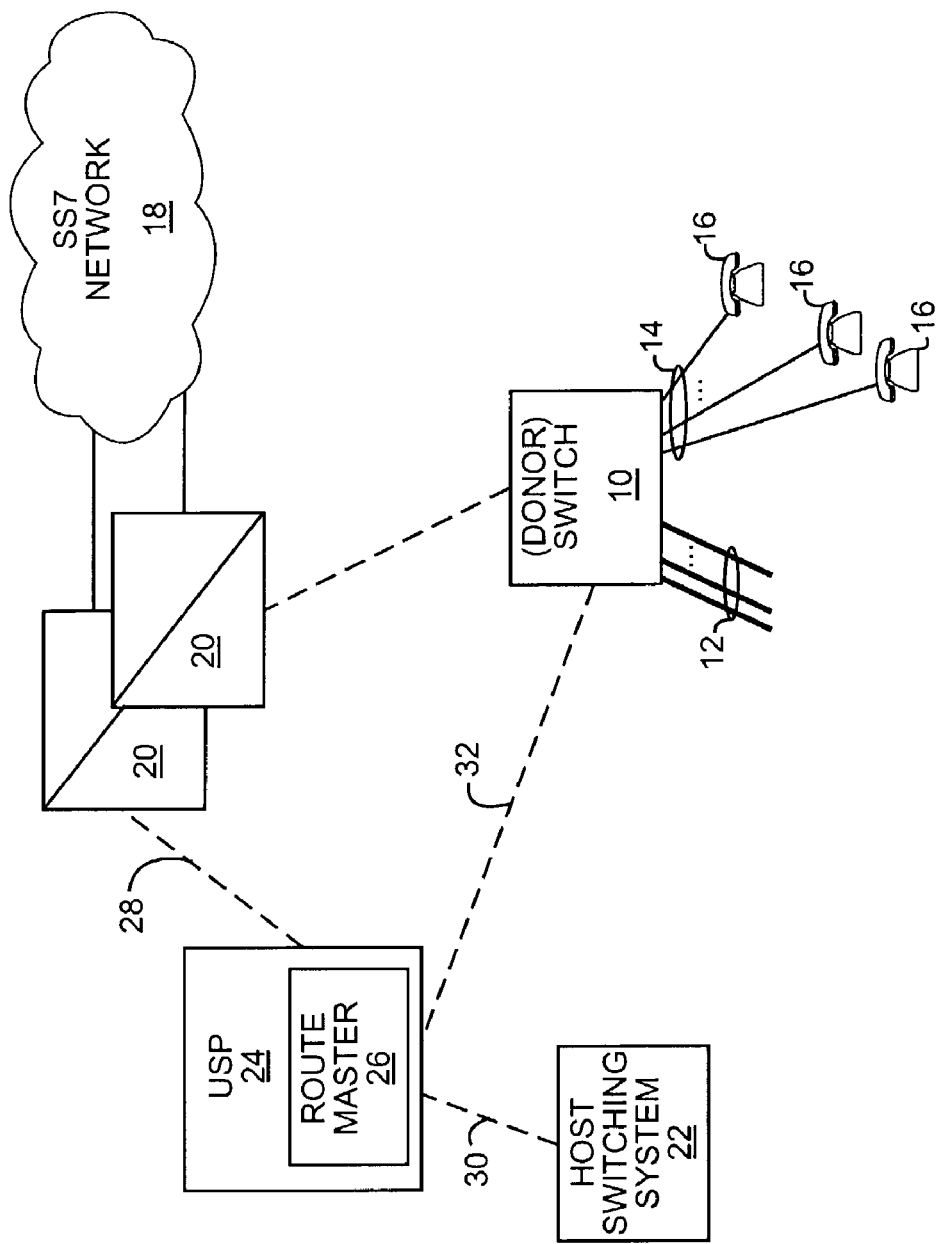
FIGS. 3-8 are block representations of various stages throughout a transitional process, which essentially moves all lines and trunks from a first switching system to a second switching system according to one embodiment of the present invention.

The primary elements associated with the transitioning technique of the present invention are illustrated in FIG. 3. In addition to the switch 10 and STPs 20 introduced in FIG. 1, a host switching system 22 is shown and will represent an office or other switching entity to which the trunks 12 and lines 14 of switch 10 will be transitioned. The switch 10 will be referred to as a donor switch 10, as it will be donating trunks 12 and lines 14 to the host switching system 22. The primary entity facilitating the present invention is a universal signaling point (USP) 24, including route master logic 26 for directing call signaling between the donor switch 10, the host switching system 22, and the SS7 network 18 via the STPs 20. Thus, the USP 24 is effectively a signaling gateway for the host switching system 22 and the donor switch 10. The route master logic 26 will control traffic flow for call signaling, as will be described below in further detail.

In general, the USP 24 under the control of the route master 26 will direct traffic flow coming from the SS7 network 18 to either the host switching system 22 or the donor switch 10 based on the location of the corresponding trunks 12 or lines 14. Accordingly, the USP 24 can re-direct all signaling messages intended for trunks 12 or lines 14 supported by the donor switch 10 through the host switching system 22 once the trunks 12 or lines 14 are transitioned to the host switching system 22. In the preferred embodiment, the USP 24 will use the point codes associated with respective entities and either the directory number (DN) for TCAP messages associated with lines 14, or a circuit identification code (CIC) for ISUP messages associated with trunks 12 to control traffic flow. Further, call signaling originating from the host switching system 22 or donor switch 10 that is intended for elements in the SS7 network 18 is routed through the USP 24.

Figure 2A:
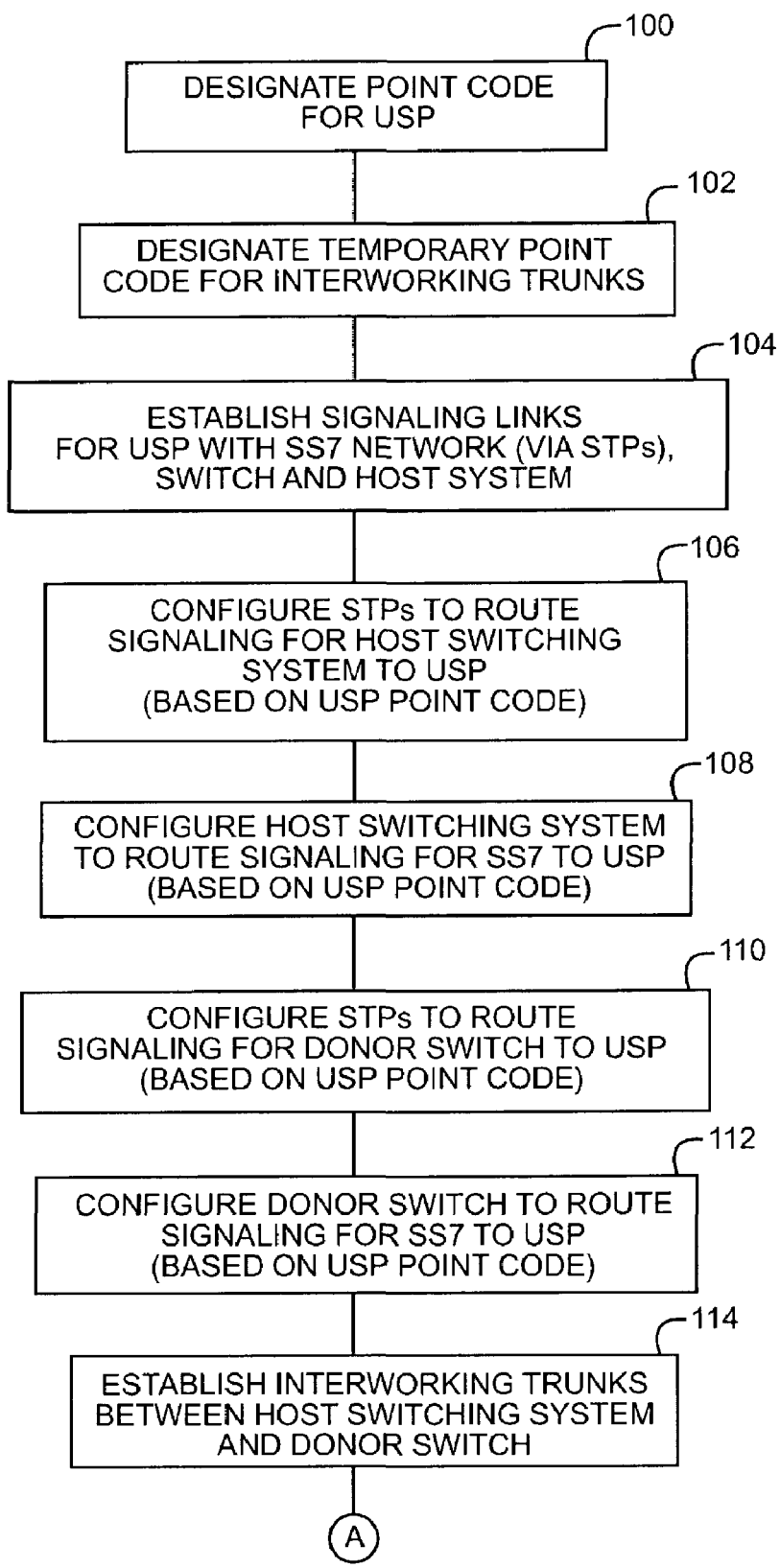
FIGS. 2A-2B are flow diagrams outlining a transitional process according to one embodiment of the present invention.
Figure 2B:
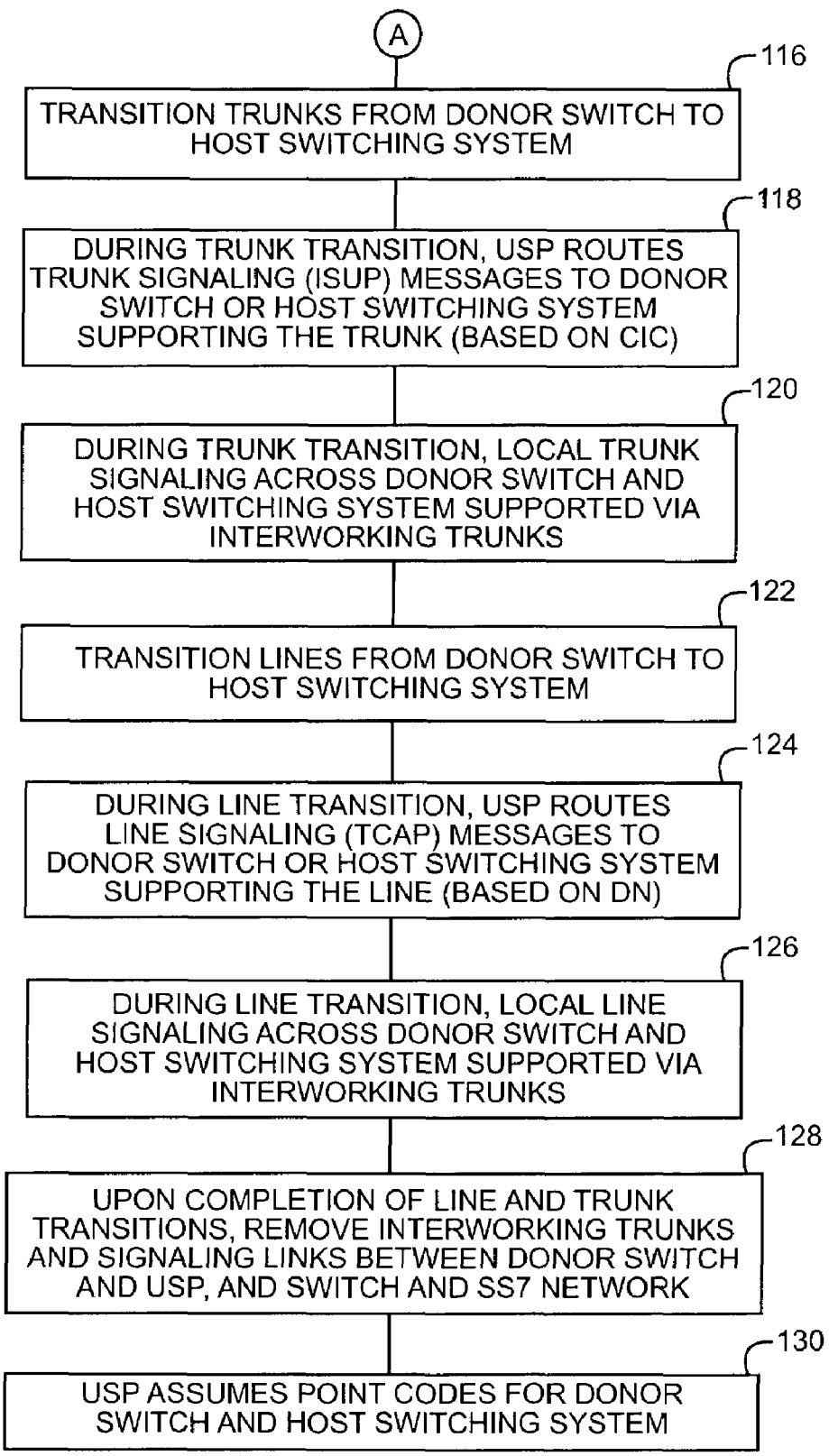

With parallel reference to FIGS. 2A-2B, the transitioning process of one embodiment of the present invention follows. Initially, the USP 24 is designated a point code such that various SS7 entities may communicate with it (step 100). Next, a temporary point code is designated for any interworking trunks, which will be described below in further detail (step 102). Once the various point codes are designated, signaling links between the USP 24 and the STPs 20 (link 28), the host switching system 22 (link 30), and the donor switch 10 (link 32) are established to facilitate signaling therebetween (step 104).

Once the signaling links are established, the STPs 20 are configured to route signaling intended for the host switching system 22 to the USP 24 based on the USP's point code (step 106). The host switching system 22 is configured to route signaling intended for other SS7 entities to the USP 24 based on the USP's point code (step 108). The STPs 20 are also configured to route signaling for the donor switch 10 to the USP 24 based on the USP's point code (step 110). Finally, the donor switch 10 is configured to route signaling for the SS7 entities to the USP 24 instead of directly to the STPs 20 (step 112).

Figure 4:
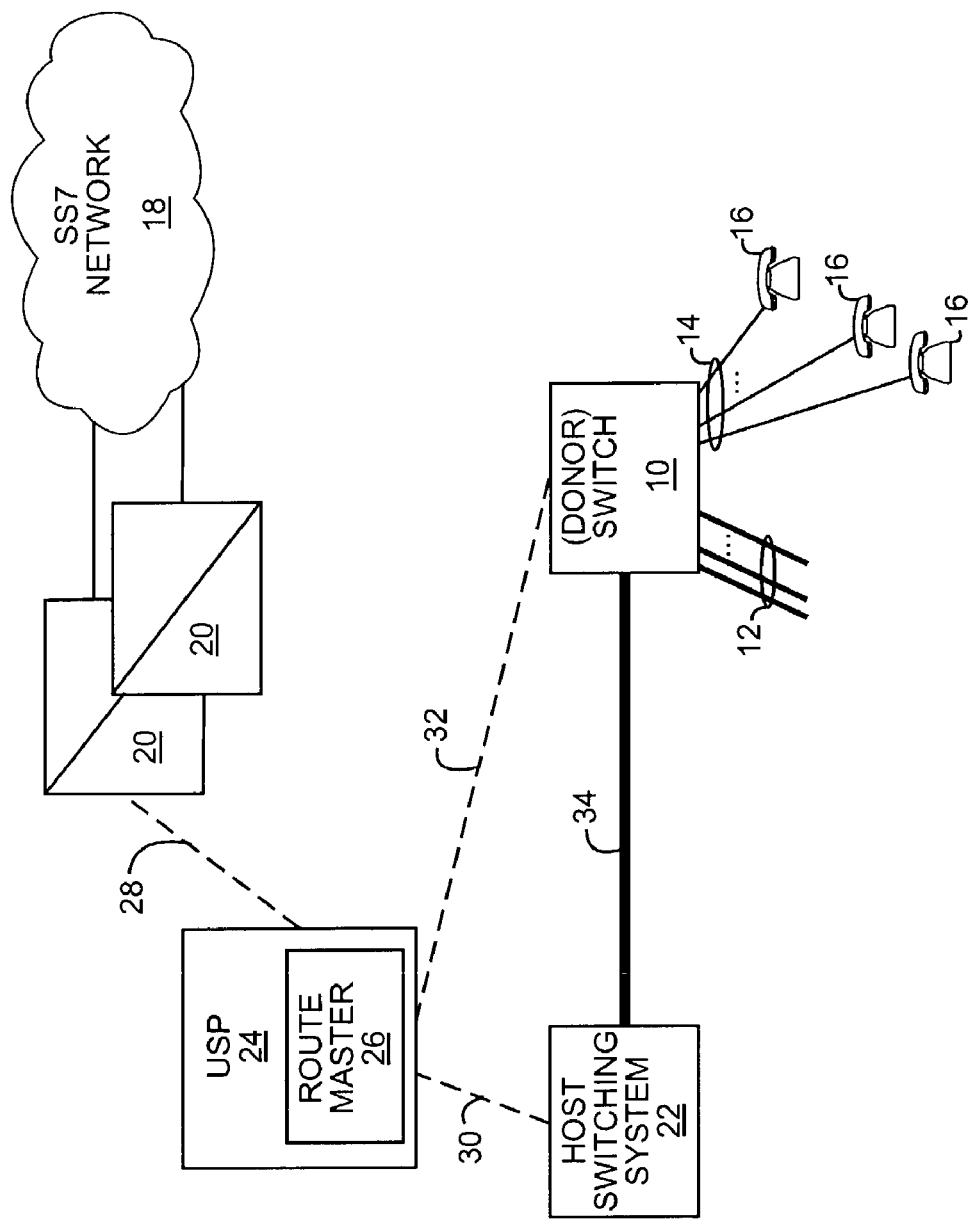

With reference to FIG. 4, the interworking trunks 34 mentioned above are established between the host switching system 22 and the donor switch 10 to facilitate local traffic (step 114). The interworking trunks 34 are necessary to support calls that would normally have been local to the donor switch 10 wherein one line 14 associated with the local call has been transitioned to the host switching system 22. The host switching system 22 and the donor switch 10 can communicate with each other using the point code for the interworking trunk 34 to set up and break down local calls.

Figure 5:
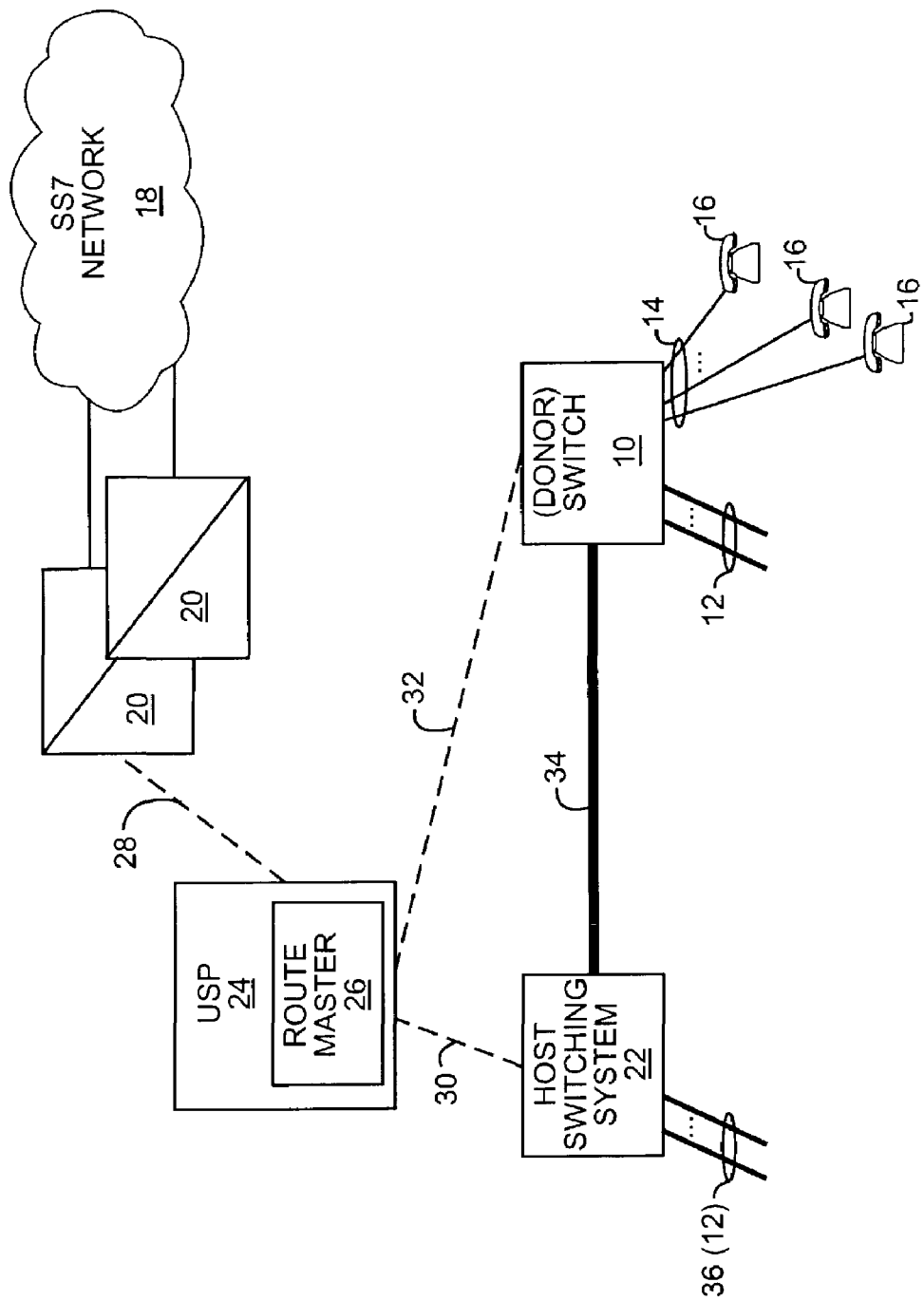

Next, the trunks 12 are transitioned from the donor switch 10 to the host switching system 22 (step 116). With reference to FIG. 5, during such transition, certain trunks 12 will remain at the donor switch 10 while the transitioned trunks 36 will be supported by the host switching system 22. During the trunk transition, the USP 24 routes trunk signaling messages, such as ISUP messages, to either the donor switch 10 or the host switching system 22, depending on the system supporting the trunk 12, 36 (step 118). If ISUP messages are being routed, routing will be based on the CIC provided in the ISUP messages. Preferably, the route master 26 is updated when the host switching system 22 receives a transitioned trunk 36 from the donor switch 10 and will keep track of the CIC or other identification indicia associated with the transitioned trunk 36. When call signaling is received by the USP 24 from the SS7 network 18, the default may be to send the message to the donor switch 10, unless the CIC number is noted as being associated with the host switching system 22. If the CIC is associated with the host switching system 22, which indicates the trunk 12, 36 has been transitioned to the host switching system 22, the message will be sent to the host switching system 22 instead of the donor switch 10. During the trunk transition, any local signaling associated with the trunks 12, 36 will be supported via the interworking trunks 34 (step 120).

Figure 6:
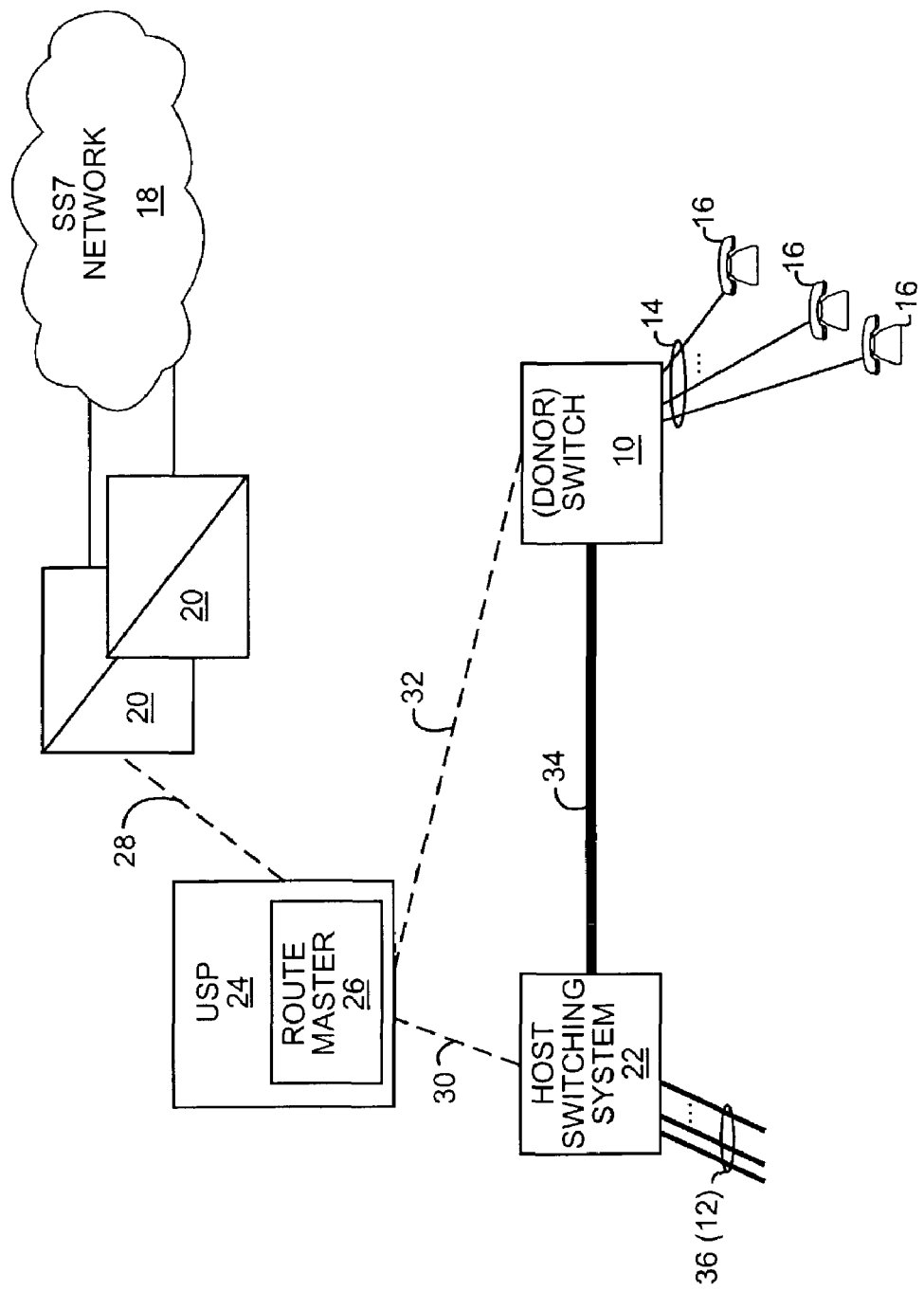
Figure 7:
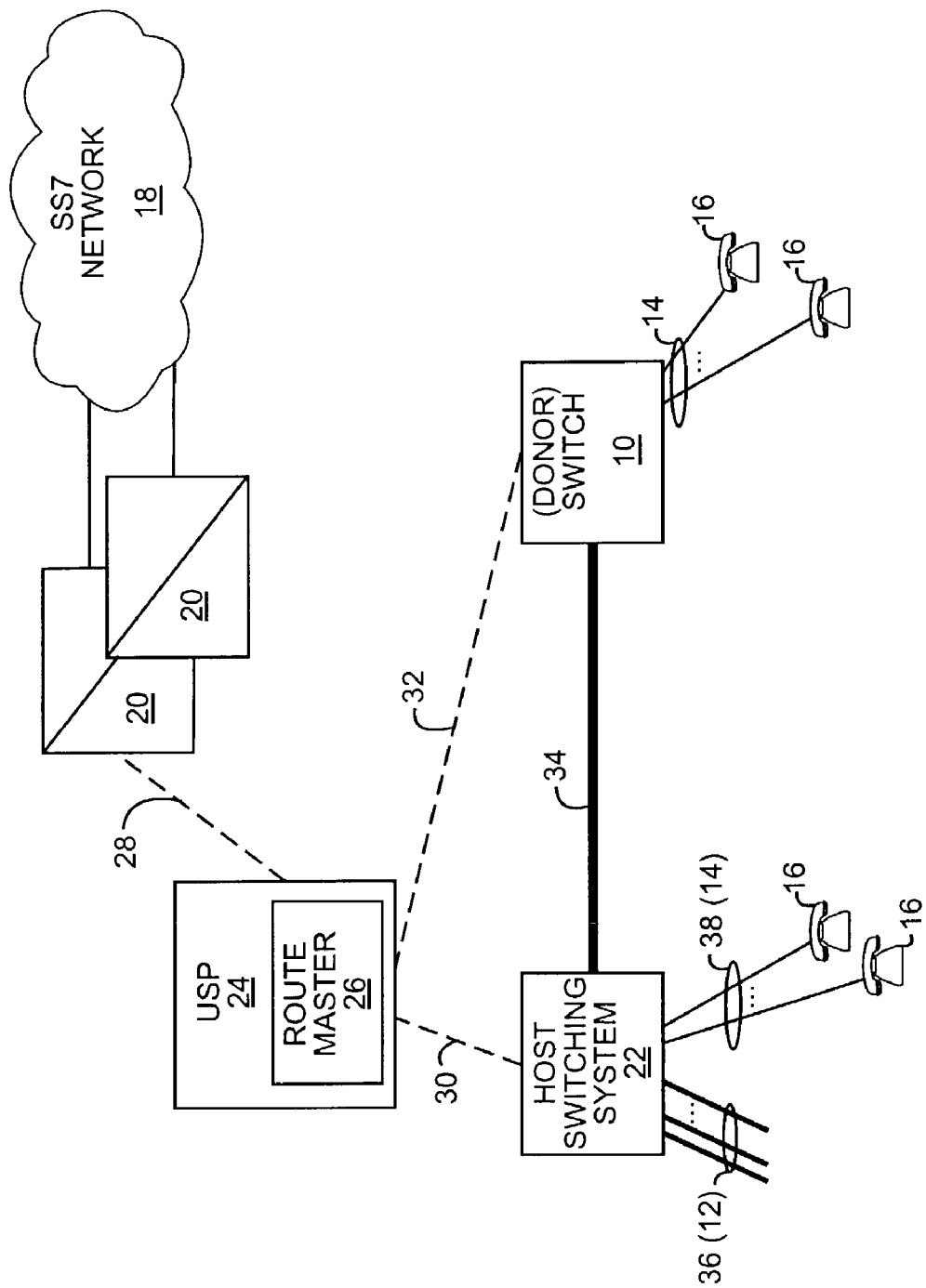

Once all of the trunks 12, 36 are transitioned to the host switching system 22 as shown in FIG. 6, the lines 14 can be transitioned from the donor switch 10 to the host switching system 22 as shown in FIG. 7 (step 122). As illustrated, the lines 14 originating at the donor switch 10 that are transitioned to the host switching system 22 are referred to as transitioned lines 38. During the line transition, the USP 24 will route call signaling messages associated with the lines 14, 38 to the donor switch 10 or the host switching system 22, whichever supports the line 14, 38 (step 124). Preferably, the USP 24 will keep track of directory numbers or other identification information for the transitioned lines 38. When messages from the SS7 network 18 arrive, the messages may be directed to either the host switching system 22 or the donor switch 10, depending on whether the host switching system 22 is supporting the transitioned line 38 or the donor switch 10 is supporting the corresponding line 14.

Those skilled in the art will recognize that the USP 24 may have a default for sending messages to either the host switching system 22 or the donor switch 10, depending on whether or not a directory number in an incoming message is recognized. Thus, the USP 24 can keep track of the lines 14 or transitioned lines 38 for both the donor switch 10 and the host switching system 22, or keep track of one or the other and provide a default for unrecognized messages. Those skilled in the art will also recognize the flexibility in creating routing tables for directing traffic flow to the appropriate donor switch 10 or host switching system 22. For SS7 signaling, the messages may be TCAP messages, and routing is based on the directory numbers provided in the TCAP messages. Also during the line transition, local calls between transitioned lines 38 supported by the host switching system 22 and lines 14 supported by the donor switch 10 are supported via call signaling over the interworking trunks 34 (step 126).

Figure 8:
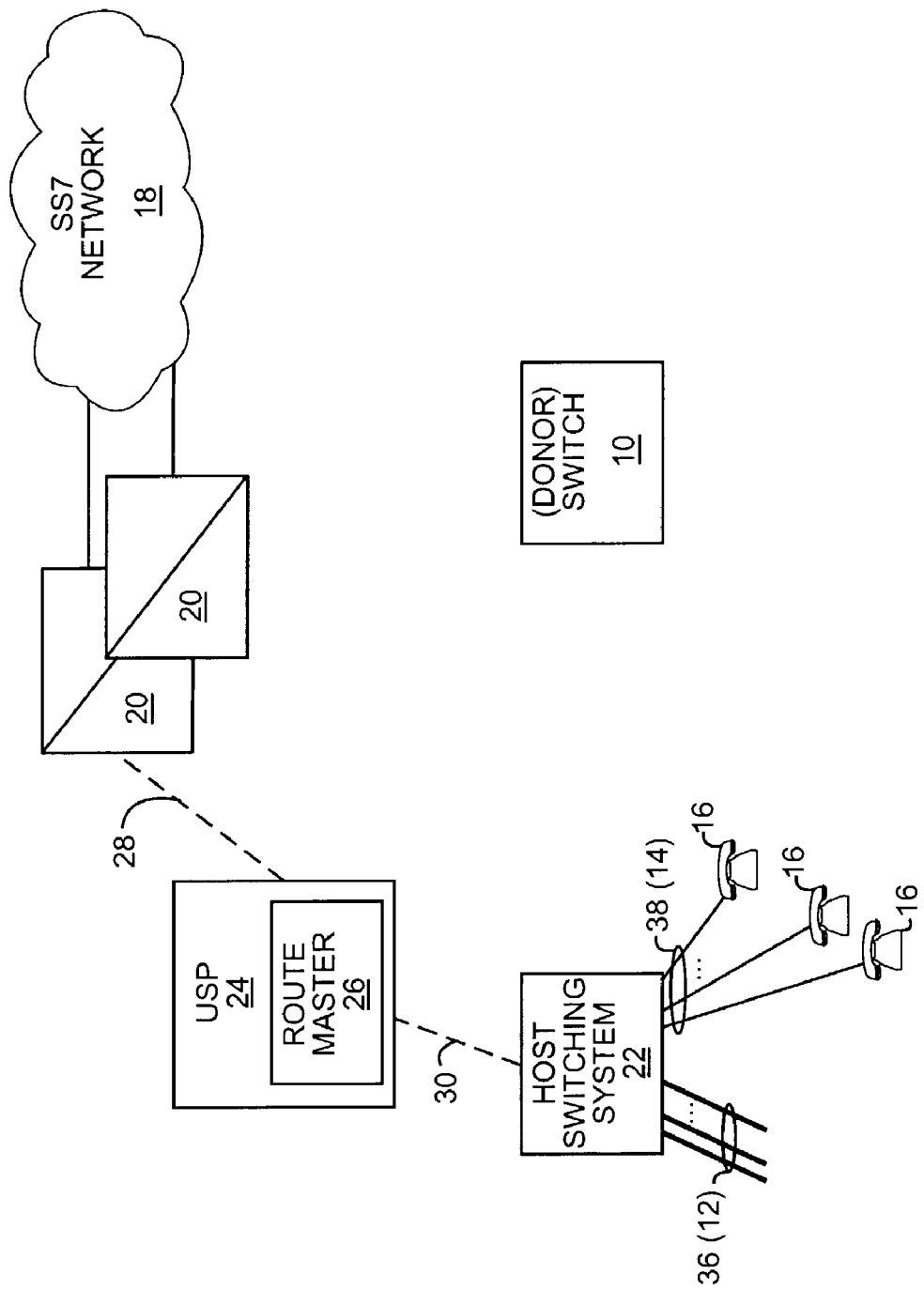

Upon completion of the transition of the lines 14 and the trunks 12, the interworking trunks 34 and signaling links between the donor switch 10 and the USP 24, as well as those between the donor switch 10 and the STPs 20 or the SS7 network 18 are removed (step 128), such that all call signaling intended for the donor switch 10 or the host switching system 22 is directed to the host switching system 22, as illustrated in FIG. 8. Notably, the USP 24 will assume the point codes for both the donor switch 10 and the host switching system 22 until the remaining elements in the SS7 network 18 are configured otherwise (step 130). Further, the host switching system 22 is preferably capable of handling call signaling messages directed to multiple point codes, wherein one of the point codes is that of the donor switch 10. In this way, when the USP 24 routes call signaling originally intended for the donor switch 10 to the host switching system 22, the host switching system 22 can simply take action and respond as necessary based on the call signaling message.

Thus, in one embodiment, the USP 24 can simply direct incoming messages intended for the donor switch 10 to the host switching system 22 as necessary, with little or no modification of the actual message, and direct messages from either the donor switch 10 or the host switching system 22 to the SS7 network 18 in similar fashion. Alternatively, the USP 24 may reconfigure or repackage the call signaling messages intended for the donor switch 10 and deliver them to the point code or other address associated with the host switching system 22. In this case, the host switching system 22 must be able to recognize that the message has been reconfigured or otherwise modified, and process the message accordingly.

With reference to FIGS. 9A and 9B, exemplary embodiments for the host switching system 22 are provided. In FIG. 9A, a traditional PSTN switch 40 provides the basis for an office acting as the host switching system 22, wherein call signaling is provided over a traditional intelligent network infrastructure, such as that provided by the SS7 network 18. In FIG. 9B, an alternative call signaling environment within the host switching system 22 is provided, wherein a call server (CS) 42 interacts with the SS7 network 18 or other intelligent network and facilitates call signaling between one or more gateways, such as a trunk gateway 44 supporting the transitioned trunks 36 and a line gateway 46 supporting the transitioned lines 38. Call signaling for the trunk gateway 44 and line gateway 46 via the call server 42 may be provided via any type of network, such as an Internet Protocol (IP) network. Those skilled in the art will recognize various forms the host switching system 22 may take and still function to terminate transitioned trunks 36 and transitioned lines 38, as well as providing the necessary call signaling for operation.

In general, and as illustrated in FIG. 10, the USP 24 will include a control system 48 with sufficient memory 50 allowing software 52 to operate to implement the invention. The control system 48 is preferably associated with one or more network interfaces 54 to facilitate call signaling with the SS7 network 18 directly or via the STPs 20, the donor switch 10, and the host switching system 22. The network interfaces 54 may support one or more network protocols and infrastructures.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    a) at a universal signaling point (USP), intercepting a call signaling message associated with a telephony element originally associated with a donor switching system from a call signaling network, the telephony element being at least one of the group consisting of telephony lines and telephony trunks; and
    b) routing the call signaling message to:
        i) the donor switching system if the telephony element is supported by the donor switching system, and
        ii) a host switching system if the telephony element has been transitioned to the host switching system, the host switching system adapted to terminate call signaling messages, during the transition of the telephony element, for a first point code associated with the donor switching system and for a second point code associated with the host switching system.

2. The method of claim 1 further comprising providing a single point code or IP signaling address to the call signaling network that is identical to the original address assigned to the donor switching system, thereby eliminating a need for other signaling entities in the call signaling network to be provisioned with a new point code or signaling address for the host switching system.

3. The method of claim 1 further comprising storing information bearing on the transition of telephony elements from the donor switching system to the host switching system and wherein the routing of the call signaling message is based on the information.

4. The method of claim 1 further comprising monitoring identification indicia associated with the telephony element in the call signaling message and wherein the routing of the call signaling message is based on the identification indicia.

5. The method of claim 4 wherein the identification indicia is a directory number in a TCAP call signaling message for a telephony line.

6. The method of claim 4 wherein the identification indicia is a circuit identification code in an ISUP call signaling message for a telephony trunk.

7. The method of claim 1 wherein when the call signaling message is directed to the first point code for the donor switching system, the call is routed to either the donor or host switching system supporting the telephony element and further comprising routing the call signaling message to the host switching system when the call signaling message is directed to the second point code associated with the host switching system.

8. The method of claim 1 wherein the call signaling message is received from one of a pair of signal transfer points, which originally supported the donor switching system.

9. The method of claim 1 further comprising receiving messages intended for entities in the call signaling network from the donor switching system and forwarding the messages across the call signaling network.

10. A method comprising:
   a) providing a universal signaling point (USP) adapted to:
      i) intercept a call signaling message associated with a telephony element originally associated with a donor switching system from a call signaling network, the telephony element being at least one of the group consisting of telephony lines and telephony trunks; and
      ii) route the call signaling message to:
         1) the donor switching system if the telephony element is supported by the donor switching system, and
         2) a host switching system if the telephony element has been transitioned to the host switching system, the host switching system adapted to terminate call signaling messages, during the transition of the telephony element, for a first point code associated with the donor switching system and for a second point code associated with the host switching system;
   b) establishing signaling links between the USP and the host switching system, the donor switching system, and the call signaling network; and
   c) configuring the call signaling network to deliver the call signaling message to the USP instead of the donor switching device.

11. The method of claim 10 further comprising configuring the donor switching system to send the call signaling message intended for the call signaling network to the USP instead of the call signaling network.

12. The method of claim 10 further comprising establishing an intenworking trunk between the donor and host switching systems to support local calls between telephony elements supported by the donor and host switching systems.

13. The method of claim 10 further comprising transitioning telephony elements from the donor switching system to the host switching system and providing information bearing on the transition of the telephony elements from the donor switching system to the host switching system to the USP and wherein the routing of the call signaling message by the USP is based on the information.

14. The method of claim 10 further comprising monitoring identification indicia associated with the telephony element in the call signaling message and wherein the routing of the call signaling message by the USP is based on the identification indicia.

15. The method of claim 14 wherein the identification indicia is a directory number in a TCAP call signaling message for a telephony line.

16. The method of claim 14 wherein the identification indicia is a circuit identification code in an ISUP call signaling message for a telephony trunk.

17. The method of claim 10 wherein when the call signaling message is directed to the first point code for the donor switching system, the call signaling message is routed to the USP and forwarded to either the donor or host switching system supporting the telephony element and the USP routes the call signaling message to the host switching system when the call signaling message is directed to the second point code associated with the host switching system.

18. The method of claim 17 wherein the host switching system can process the call signaling messages associated with the first and second point codes.

19. The method of claim 10 wherein the call signaling message is received from one of a pair of signal transfer points, which originally supported the donor switching system.

20. The method of claim 10 further comprising receiving messages intended for entities in the call signaling network from the donor switching system and forwarding the messages across the call signaling network.

21. An apparatus comprising:
   a) at least one interface facilitating links to a host switching system, a donor switching system, and a call signaling network; and
   b) a control system associated with the at least one interface and adapted to:
      i) receive a call signaling message associated with a telephony element originally associated with the donor switching system from the call signaling network, the telephony element being at least one of the group consisting of telephony lines and telephony trunks; and
      ii) route the call signaling message to:
         1) the donor switching system if the telephony element is supported by the donor switching system, and
         2) the host switching system if the telephony element has been transitioned to the host switching system, the host switching system adapted to terminate call signaling messages, during the transition of the telephony element, for a first point code associated with the donor switching system and for a second point code associated with the host switching system.

22. The apparatus of claim 21 wherein a single point code or IP signaling address is provided to the call signaling network that is identical to the original address assigned to the donor switching system, thereby eliminating a need for other signaling entities in the call signaling network to be provisioned with a new point code or signaling address for the host switching system.

23. The apparatus of claim 21 wherein the control system is further adapted to store information bearing on the transition of telephony elements from the donor switching system to the host switching system and wherein the routing of the call signaling message is based on the information.

24. The apparatus of claim 21 wherein the control system is further adapted to monitor identification indicia associated with the telephony element in the call signaling message and wherein the routing of the call signaling message is based on the identification indicia.

25. The apparatus of claim 24 wherein the identification indicia is a directory number in a TCAP call signaling message for a telephony line.

26. The apparatus of claim 24 wherein the identification indicia is a circuit identification code in an ISUP call signaling message for a telephony trunk.

27. The apparatus of claim 21 wherein when the call signaling message is directed to the first point code for the donor switching system, the call is routed to either the donor or host switching system supporting the telephony element and the control system is further adapted to route the call signaling message to the host switching system when the call signaling message is directed to the second point code associated with the host switching system.

28. The apparatus of claim 21 wherein the call signaling message is received from one of a pair of signal transfer points, which originally supported the donor switching system.

29. The apparatus of claim 21 wherein the control system is further adapted to receive messages intended for entities in the call signaling network from the donor switching system and forward the messages across the call signaling network.

* * * * *